US006317548B1

(12) United States Patent
Rockwell et al.

(10) Patent No.: US 6,317,548 B1
(45) Date of Patent: Nov. 13, 2001

(54) TEMPERATURE AND OPTICAL LENGTH CONTROL OF OPTICAL FIBERS AND OPTICAL WAVEGUIDE DEVICES

(75) Inventors: David A. Rockwell, Culver City; Monica L. Minden, Calabasas, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/266,238

(22) Filed: Mar. 11, 1999

(51) Int. Cl.$^7$ ..................................... G02B 6/02
(52) U.S. Cl. .............. 385/123; 385/124; 385/14; 385/42; 359/341
(58) Field of Search ..................... 385/123, 124, 385/5, 9, 11, 14, 42, 37; 372/6; 359/341

(56) References Cited

U.S. PATENT DOCUMENTS

| | | | |
|---|---|---|---|
| 5,347,437 | * 9/1994 | Bobb | 356/345 |
| 5,377,288 | * 12/1994 | Kashyap et al. | 385/37 |
| 5,644,125 | * 7/1997 | Wobschall | 250/227.27 |
| 5,920,666 | * 7/1999 | Dignonnet et al. | 385/16 |
| 5,936,762 | * 8/1999 | Samson et al. | 359/341 |

OTHER PUBLICATIONS

Q. Lai et al., "Low–Power Compact 2 x 2 Thermooptic Silica–on Silicon Waveguide Switch with Fast Response, " IEEE Photonics Technology Letters , vol. 10, No. 5, May 1998, pp 681–683.

M. K. Davis et al., "Thermal Effects in Doped Fibers, " Journal of Lightwave Technology , vol. 16, No. 6, Jun. 1998, pp 1013–1023.

* cited by examiner

Primary Examiner—Rodney Bovernick
Assistant Examiner—Sung Pak
(74) Attorney, Agent, or Firm—T. Gudmestad (57) ABSTRACT

An optical fiber has a concentration of dopant ions residing within its core region. The dopant ions absorb optical energy at an excitation wavelength, converting that optical energy to heat and/or a change in the index of refraction and optical length of the optical fiber. Optical energy of the excitation wavelength is transmitted through the optical fiber simultaneously or sequentially with optical energy of a signal wavelength different from the excitation wavelength. The optical energy of the excitation wavelength controls the temperature of the optical fiber and/or its optical length as a result of (a) the temperature dependence of the refractive index and the physical length of the optical fiber, and (b) the change in polarizability of the optical fiber medium (and hence its refractive index) due to a change in the population distribution among the energy levels of the dopant ions.

32 Claims, 4 Drawing Sheets

TEMPERATURE AND OPTICAL LENGTH CONTROL OF OPTICAL FIBERS AND OPTICAL WAVEGUIDE DEVICES

BACKGROUND OF THE INVENTION

This invention relates to optical fibers and optical waveguides, and, more particularly, to precision control of the temperature and/or the optical length of an optical fiber or optical waveguide.

An optical fiber typically includes a core of a first glass, a casing of a second glass overlying the core, and a protective layer overlying the casing. Light introduced into the core is propagated by an internal reflection mechanism along the length of the optical fiber, following the path of the optical fiber with essentially no loss of energy. The light may be propagated over great distances and through complex paths. These same properties may also be obtained using optical waveguides, which are typically etched integrated optics devices formed on a substrate. As used herein, the term "optical fiber" will be understood to encompass both discrete optical fibers and integrated optical waveguides, unless the context indicates the contrary.

In some applications of optical fibers, it is important to determine and control the temperature and/or the optical length of the optical fiber very precisely. (The "optical length" is the product of the physical length of the optical fiber and its index of refraction.) The temperature and optical length of the optical fiber are linked through the effect of temperature on the refractive index of the glass and through the temperature coefficient of expansion of the glass of the optical fiber.

As an example of an application, an interferometer may be made with one or both of the two interfering light paths being optical fibers. The relative optical lengths of the two light paths of the interferometer must be controlled very precisely for many applications. Because the optical length of the optical fiber is a function of the temperature, one approach for controlling the optical length is to heat the optical fiber to increase its optical length and to cool the optical fiber to decrease its optical length. It may also be necessary to dynamically heat or cool the optical fiber to stabilize its optical length against changes in the environment.

Various types of heaters may be used to heat the optical fiber by applying heat, and to cool the optical fiber by reducing the heat input. In one type of heater, a wire is wrapped around the optical fiber. Thin film heaters contacting the optical fiber are also used. A flat-sided fiber may be heated by an applied electric field. These different approaches work to varying degrees, but have disadvantages in respect to response times for temperature changes, difficulty and cost of fabrication and maintenance, insertion loss, and physical length limitations on the optical length of the optical fiber.

There is a need for an improved approach to controlling the temperature and the optical length of an optical fiber. The present invention fulfills this need, and further provides related advantages.

SUMMARY OF THE INVENTION

The present invention provides an optical fiber device and method for its use, wherein the optical fiber device has an optical fiber with a precisely controlled temperature and/or optical length. The optical length of the optical fiber is related to its temperature through the effect of temperature on the refractive index of the glass and/or through the temperature coefficient of expansion of the glass of the optical fiber. The optical length of the optical fiber may thereby be controlled to a fraction of a wavelength of the propagated light energy signal. The response times for heating and cooling temperature changes are sufficiently fast for many applications. The thermal approach for control of the optical length of the optical fiber can achieve changes over time scales on the order of 0.1 to 1 milliseconds, or longer; this response time is established by physical limitations on how fast the fiber temperature may change.

The present invention also provides for faster response times (1 millisecond or less) by exploiting the fact that the index of refraction of the optical fiber and, hence, its optical length depend upon the polarizability of the fiber medium. Specifically, the polarizability depends on the properties of any dopants that might be present in the fiber as well as the properties of the glass that is used to make the fiber. Consequently, the polarizability may be rapidly controlled by changing the population distribution among the energy levels of the dopant ions. It may be necessary to dynamically adjust this population distribution to stabilize the fiber's optical length against changes in the environment.

The physical length of the optical fiber over which the temperature and optical length may be precisely controlled according to this invention is greater than for some other approaches in the art. That is, it is possible to fabricate longer lengths of optical fibers having controllable optical lengths than with prior techniques. Neither the heating and cooling, nor variations in the polarizability, adversely affects the signal transmission performance of the optical fiber in any significant way.

In accordance with the invention, an optical fiber device comprises a first optical fiber having a first-fiber core region transmissive to optical energy of a signal wavelength and absorptive to optical energy of an excitation wavelength different from the signal wavelength. A concentration of one or more dopant ions resides within the core region. The dopant ions are operable to absorb optical energy at the excitation wavelength. The absorbed optical energy is converted to heat, thereby raising the temperature, or modifies the population distribution among the energy levels of the dopant ions, thereby changing the polarizability and index of refraction of the fiber medium. A first source of optical energy of the excitation wavelength is coupled into the first optical fiber in order to excite the dopant ions and thence alter the optical length of the first optical fiber. A second source of optical energy at the signal wavelength is coupled into the first optical fiber as the source of the signal to be transmitted through the optical fiber.

The first source is operated to control either the temperature of the optical fiber, or the optical length of the optical fiber, via the dependence of the index of refraction on temperature or polarizability, or the temperature-dependence of the physical length of the optical fiber. The second source is operated to transmit a signal through the optical fiber. Because the two sources operate at different optical wavelengths and because the dopant ions are responsive to only the excitation wavelength of the first source, the heating and cooling performance is independent of the signal transmission performance.

In an application of interest to the inventors, the first optical fiber is one arm of an optical-fiber interferometer. Preferably, there is a second optical fiber serving as the second arm of the interferometer. The second arm may be doped or undoped. Even if the temperature of the second optical fiber is not to be controlled, it is preferred that the second optical fiber also be doped with the same concentration of the dopant ions so that the two optical fibers have the same optical and thermal expansion properties.

The temperature or the optical length of the optical fiber is controlled by operating the first source of optical energy to excite the dopant ions. (In each case, the optical length of the optical fiber is established, although for some applications the established temperature of the optical fiber is of paramount interest, and the established optical length is incidental.) Heat energy generated as a consequence of this excitation is conducted into the surrounding core material, thereby heating it and changing the index of refraction or the physical length of the optical fiber, while the change in polarizability also changes the index of refraction of the optical fiber. The optical fiber, once excited, may be maintained at the excited state by continuing to operate the first source. The optical fiber may be cooled, or its optical length may be restored, by reducing or discontinuing the power to the first source. The temperature or the optical length of the optical fiber may be readily controlled to a set point temperature or optical length by using a feedback controller that monitors the light received at the output end of the controlled optical fiber, and feeding that information back to the power input of the first source.

The approach of the invention allows the temperature, the optical length, or the polarizability of the optical fiber to be precisely controlled, with a short response time to achieve temperature and optical length changes. The structure of the invention is readily fabricated, and does not require delicate assembly of heater wires to optical fibers. There is no concern that heater wires may damage or cause failure to the optical fibers or associated structure, as there is when heating elements are used to heat the optical fibers. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 6A–6D is a schematic depiction of the controlling of the phase front of multiple light beams using the approach of the invention, wherein

DETAILED DESCRIPTION OF THE INVENTION

Figure 1A:
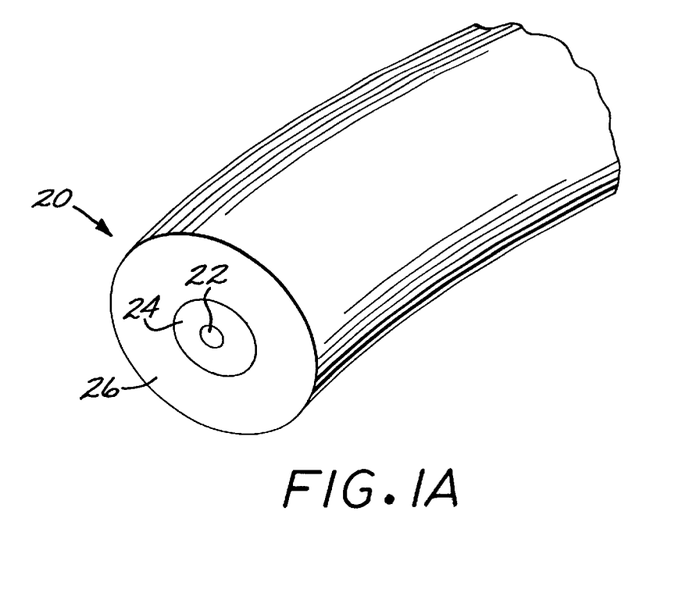
FIG. 1A is a perspective view of an optical fiber.

FIG. 1A illustrates a preferred form of an optical fiber 20. The optical fiber 20 has a core region 22 made of a glass that is transparent to optical energy of a signal wavelength and is absorptive to optical energy of an excitation wavelength. The optical fiber may be of any known type, including but not limited to a polarization-maintaining fiber or a multi-clad fiber. The signal wavelength and the excitation wavelength are different, but both the signal wavelength and the excitation wavelength are typically in the visible or the infrared bands. A glass cladding 24 overlies the core region 22. A polymeric protective buffer layer 26 overlies the glass cladding 24. The optical fiber 20 may be short or quite long, on the order of miles. Such optical fibers, except for modifications to be discussed subsequently, are well known in the art, and are available from many sources. Associated hardware such as light sources, couplers, splitters, and the like are also known in the art and available from many sources.

Figure 1B:
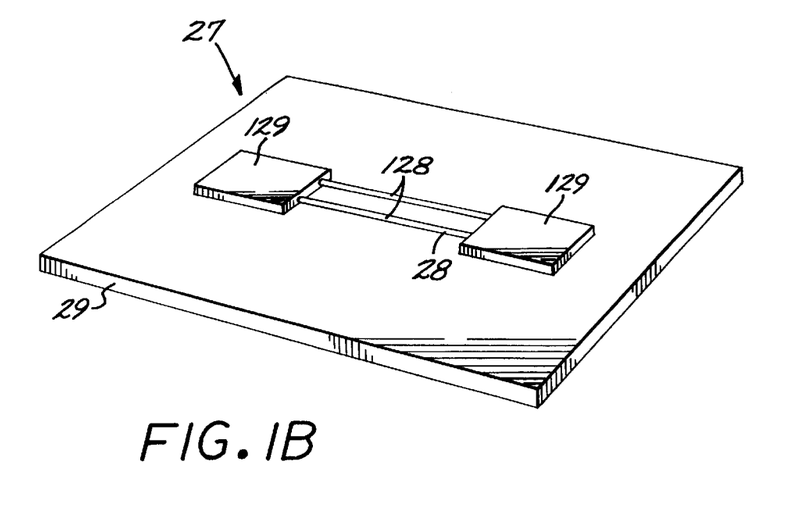
FIG. 1B is a perspective view of an integrated optical waveguide.

FIG. 1B depicts an integrated optical waveguide 27. In one form of the integrated optical waveguide 27, a layer 28 of silica glass overlies a silicon substrate 29. The glass layer 28 is patterned to form waveguides 128 connecting devices 129. The silica layer 28 comprises a core and a cladding as previously described, except that the core and cladding are formed by deposition and patterning. Light signals are propagated through the silica layer 28 in much the same manner as described above for the optical fiber. The term "optical fibers" as used herein includes both discrete optical fibers 20 and integrated optical waveguides 27. For example, the devices described subsequently in relation to FIGS. 2, 4, 5, and 6 may be implemented either as discrete optical fibers 20 or integrated optical waveguides 27.

In the approach of the invention, the core region 22 is doped with a concentration of at least one dopant ion which is operable to absorb optical energy at the excitation wavelength, and to convert that absorbed optical energy to heat through increased atomic movement or to a change in the polarizability of the dopant ions. (There may be two, three, or more species of dopant ions used in a single optical fiber.) As an example, the dopant atom may be neodymium (Nd), at a preferred dopant concentration in the range of about $10^{18}$ to about $10^{20}$ ions per cubic centimeter. Neodymium absorbs optical energy at about 808 to about 810 nanometers wavelength, which may be selected as the excitation wavelength. Other dopant concentrations are operable, but the indicated dopant concentration is preferred. In another example, the dopant atom may be ytterbium (Yb), at a preferred dopant concentration in the range of about $10^{18}$ to about $10^{20}$ ions per cubic centimeter. Ytterbium absorbs optical energy at about 915 and about 975 nanometers wavelength, which may be selected as the excitation wavelength.

The neodymium and other dopants, while having known absorption peaks that absorb light energy at the selected excitation wavelengths, absorb substantially no light energy at many other wavelengths. Any of such other wavelengths may be chosen as the signal wavelengths. These signal wavelengths are often selected for reasons associated with specific applications of the optical fiber device, and therefore no generalization may be made about the selection of the signal wavelengths. In an application of interest to the inventors and which is the preferred embodiment, the core glass is fused silica, the dopant is neodymium at a concentration in the range of about $10^{18}$ to about $10^{20}$ ions per cubic centimeter, the excitation wavelength is from about 808 to about 810 nanometers, and the signal wavelength is about 1550 nanometers.

The doped optical fiber 20 is manufactured by conventional techniques well known in the art. The dopant is introduced into the glass melt from which the core is drawn or deposited, and then the core 22 is produced by the usual approach. The cladding 24 and the protective layer 26 are added by the known techniques.

Figure 2:
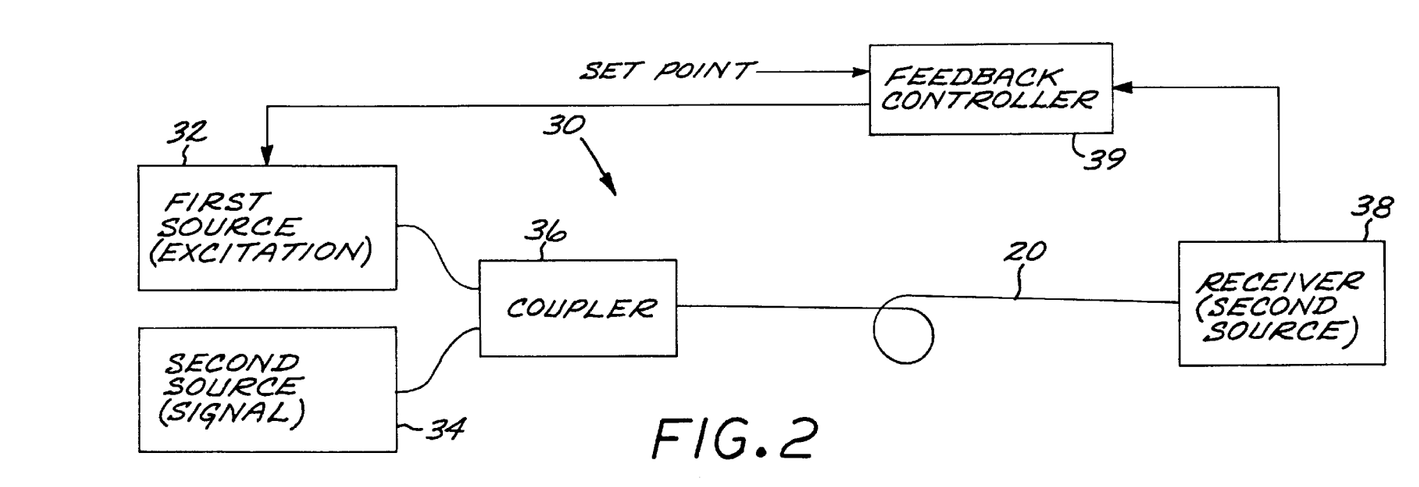
FIG. 2 is a schematic drawing of a optical fiber device in accordance with the invention.

FIG. 2 illustrates an optical fiber device 30 using a doped optical fiber 20 (or integrated optical waveguide 27) as described above. The optical fiber device 30 includes a first source 32 of optical energy of the excitation wavelength and a second source 34 of optical energy of the signal wavelength. Sources of energy of various wavelengths within the bands of interest are known in the art. The first source 32 is typically a semiconductor diode laser or a fiber laser operating at the excitation wavelength, and the second source 34 is typically a semiconductor diode laser or a fiber laser operating at the signal wavelength. The first source 32 and the second source 34 are coupled into the optical fiber 20 by a conventional coupler 36. The optical energy transmitted through the optical fiber 20 is received by a receiver 38. The receiver 38 is selected to be sensitive to the signal wavelength produced by the second source 34. Optionally, the output of the receiver 38 may be used as the input to a feedback controller 39, whose output drives the first source 32 of optical energy of the excitation wavelength. In this case, the receiver 38 generates an error signal that is proportional to the deviation of the actual temperature or optical length of the optical fiber 20 from its desired setpoint value. This error signal is generated using any of a number of well known approaches, depending on the specific application, and examples are discussed below. The feedback controller may then use this error signal as its control input to maintain the temperature or the optical length of the optical fiber 20 at the setpoint value through automatic adjustments to the power input of the first source 32.

Figure 3:
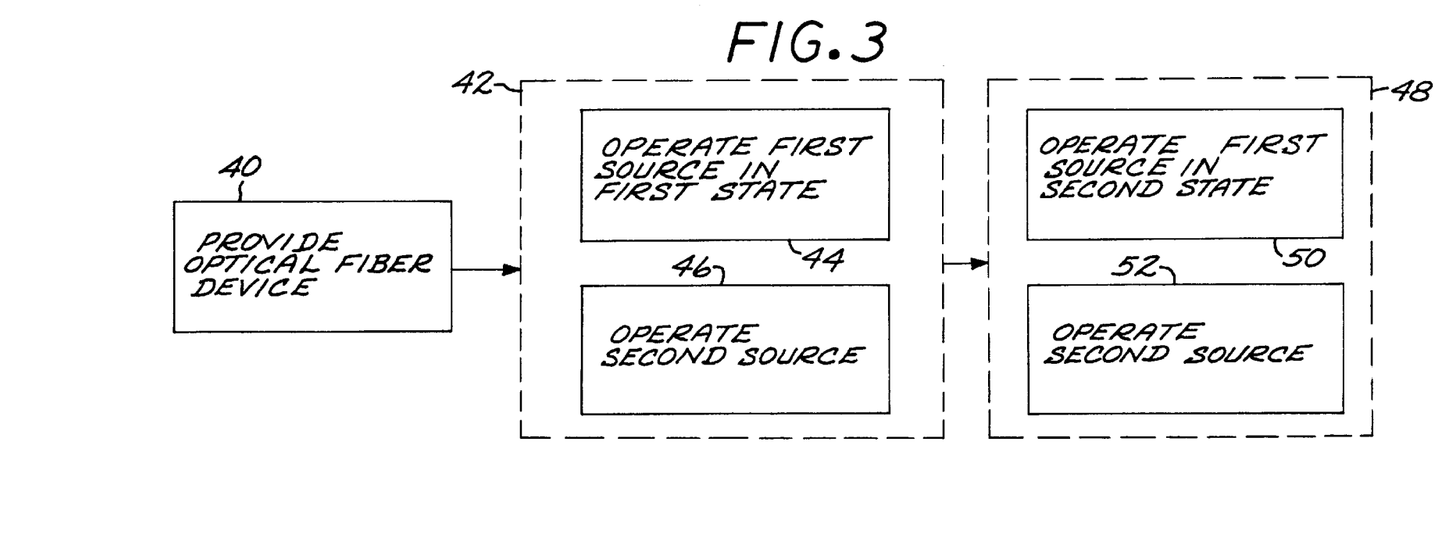
FIG. 3 is a block flow diagram of an approach for practicing a method according to the invention.

FIG. 3 is a representation of a preferred method for practicing the invention. An optical fiber device, such as the optical fiber device 30, the optical fiber device described subsequently in relation to FIGS. 4 and 5, or other optical fiber device within the scope of the invention, is provided, numeral 40. In a first operational period 42, the first source 32 is operated to excite the dopant ions in the core 22 of the optical fiber 20, in a first state to heat the core to a first temperature and/or control the optical fiber length to a first optical fiber length, numeral 44. In the first state, the dopant ions absorb a first quantity of optical energy. The second source 34 is operated to transmit energy at the signal wavelength through the optical fiber 20 to the receiver 38, numeral 46. The second source 34 may be operated either prior to, simultaneously with, or subsequently to the operation of the first source 32, but is preferably operated simultaneously with the operation of the first source 32 so that the core 22 is maintained at the first temperature and the first optical length while the second source 34 is operated.

At a later time during a second operational period 48, the first source 32 is operated to excite the dopant ions in the core 22 of the optical fiber 20, in a second state to heat the core to a second temperature and/or control the optical fiber length to a second optical fiber length, numeral 50. The second state typically differs from the first state in the power output of the first source 32, which results in a second quantity of optical energy being absorbed by the dopant ions. The power output of the first source 32 during the second operational period 48 may be greater than, equal to, or less than the power output during the first operational period 42. If "greater than", the second temperature is greater than the first temperature and the second optical length is greater than the first optical length; if "equal to", the second temperature is equal to the first temperature and the second optical length is equal to the first optical length; if "less than" (which can include zero power output), the second temperature is less than the first temperature and the second optical length is less than the first optical length.

When optical energy at the excitation wavelength is coupled into the core 22 of the optical fiber 20, such optical energy is absorbed by the dopant ions within the core, and this absorption changes the optical length of the fiber as a result of three separate effects. Two effects arise from the fact that absorption at the excitation wavelength leads to an increase in the temperature of the core, which increases the optical length of the fiber due to the temperature coefficient of the index of refraction of the glass in the core 22, and the coefficient of thermal expansion of the optical fiber. In the case of the preferred silica glass material of construction of the core 22 and cladding 24, the temperature coefficient of change of the index of refraction is about $9 \times 10^{-6}$ per °C., and the coefficient of thermal expansion is about $0.55 \times 10^{-6}$ per °C. Thus, the temperature change in the index of refraction dominates over the temperature change in the length in determining the optical length of the optical fiber. The third effect that changes the optical length of the optical fiber arises from the fact that the absorbed optical power at the excitation wavelength causes a change in the population distribution among the energy levels of the dopant ions; this population redistribution changes the polarizability, and hence, the index of refraction and optical length of the optical fiber. Depending upon the specific application, the physical change of interest of the optical fiber 20 may be temperature, optical length, or temperature dependence of another property.

Figures 4, 5:
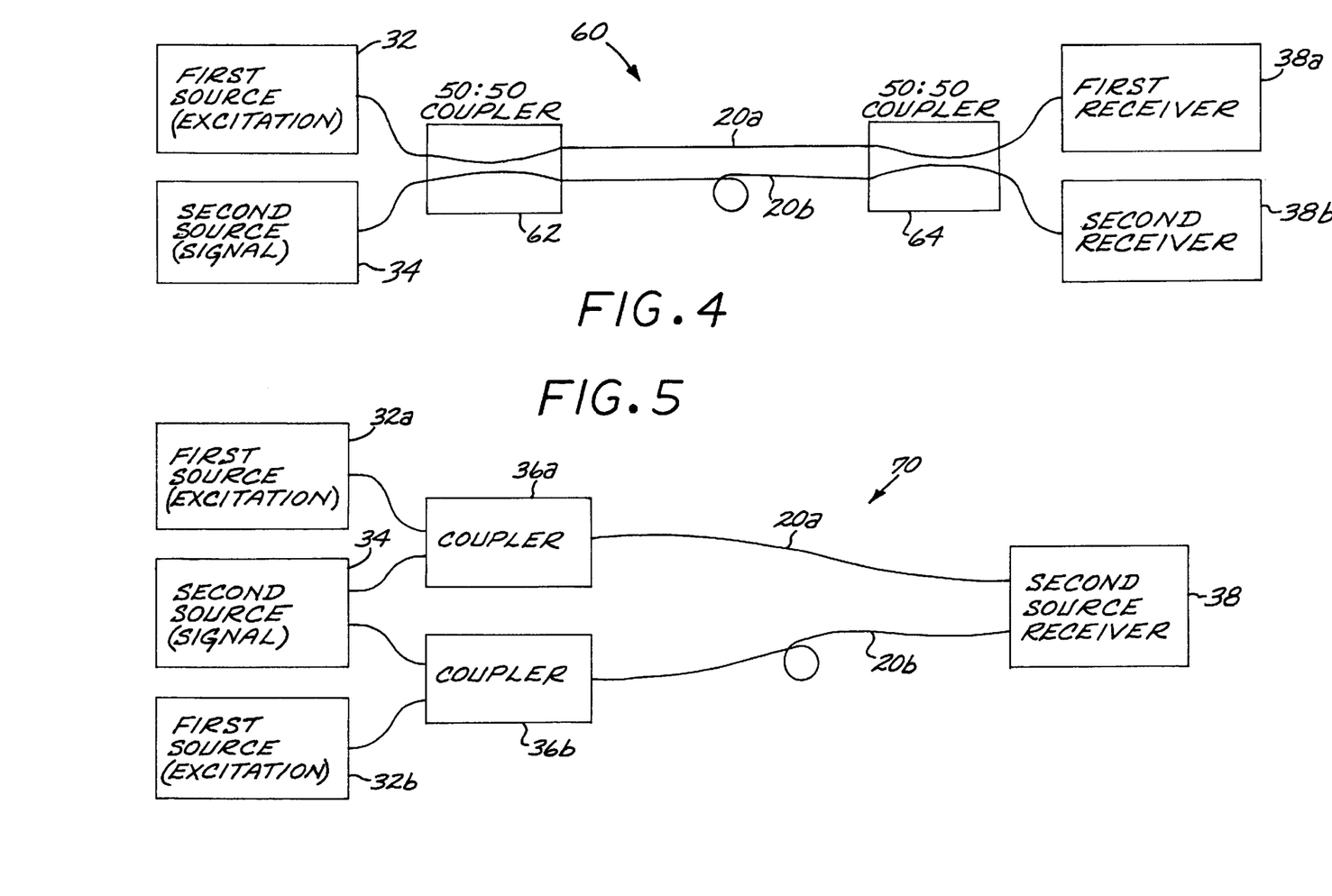
FIG. 4 is a schematic drawing of a second optical fiber device in accordance with the invention.
FIG. 5 is a schematic drawing of a third optical fiber device in accordance with the invention.

FIG. 4 depicts one preferred application of the present invention, an optical fiber interferometer 60 that is well known in the art except for the manner of control of the temperature and the optical fiber length. Elements common with those of the embodiment of FIG. 2 are given the same descriptive numerals, and the prior discussion is incorporated here. The optical fiber interferometer 60 includes a first optical fiber 20a and a second optical fiber 20b, which are typically of different optical lengths. The two optical fibers 20a and 20b are preferably polarization-maintaining (PM) or polarization-controlled optical fibers to eliminate any depolarization effects that might otherwise degrade the two-beam interference that is essential to the performance of this type of interferometer. At least one of the optical fibers 20a and 20b is doped in the manner described previously, so that it may be heated by the passage of optical energy of the excitation wavelength. Preferably, both optical fibers 20a and 20b are doped with the same dopant and in the same concentration, so that the optical properties of the two optical fibers are the same. In a typical case, however, the optical energy of the excitation wavelength passes through only one of the two optical fibers 20a and 20b.

The first source 32 provides optical energy of the excitation wavelength, and the second source 34 provides optical energy of the signal wavelength. Both the first source 32 and the second source 34 are coupled into the optical fibers 20a and 20b by a coupler, here illustrated as a 50:50 coupler 62. A feature of the 50:50 coupler 62 is that it is designed to perform equal amplitude coupling in a specific wavelength range, and not in other wavelength ranges. In the present application, the 50:50 coupler is selected to couple at the signal wavelength, and not at the excitation wavelength. The optical energy of the excitation wavelength therefore remains substantially entirely in one of the optical fibers 20a or 20b, here selected as the optical fiber 20a for illustrative purposes, while the optical energy of the signal wavelength is coupled equally into the first optical fiber 20a and the second optical fiber 20b. At the receiving end of the optical fibers 20a and 20b, the optical energy is similarly coupled out of the optical fibers 20a and 20b by a coupler, illustrated as a 50:50 optical coupler 64, into receivers 38a and 38b. In many applications of this type of interferometer, it is desired to control the optical length of the optical fiber 20a (and thence the length difference between the optical fibers 20a and 20b), such that the radiation coupled into either the first receiver 38a or the second receiver 38b is zero; for the illustrated case it is assumed, without any loss of generality, that it is desired to drive the signal into receiver 38a to zero. In this case, the deviation of the signal into receiver 38a from zero is the error signal that serves as the control input to a feedback controller, as was discussed above in connection with FIG. 2. Control of the interferometer is then achieved according to the discussion of FIGS. 2 and 3, which discussion is incorporated here. The processing of the received optical energy of the signal wavelength, which has passed through the two optical fibers 20a and 20b, for interferometric purposes is known in the art. The present invention is not concerned with that processing, but instead with the heating of one of the optical fibers in the interferometer 60 to control the optical length of that optical fiber.

FIG. 5 illustrates yet another embodiment of an interferometer 70. The prior description of the interferometer 60 is incorporated here. In the case of the embodiment of FIG. 5, two first sources 32a and 32b are provided and coupled into the two optical fibers 20a and 20b by couplers 36a and 36b, along with the optical energy of the signal wavelength from the second source 34. The architecture of FIG. 5 allows the optical lengths of the two optical fibers 20a and 20b to be controlled independently of each other, which may be valuable for some applications.

The approach of the invention has been described in general for an optical fiber and for the preferred case of an interferometer using two optical fibers. The present invention is not so limited, and may be used in other optical fiber applications as well. For example, it may be used in wavelength control of fiber Bragg gratings, coherent laser radars, and controlling the relative phase differences among individual optical fibers in an array of optical fibers.

Fiber Bragg gratings are produced using techniques well known in the art, and they are exploited in a number of devices by providing a specified reflectivity at a signal wavelength $\lambda_s$, while providing essential zero reflectivity at other wavelengths. Fiber Bragg gratings are produced by using an ultraviolet laser to create a photoinduced variation in the refractive index of the fiber, where the refractive-index variation along the length of the fiber has a periodic character with spatial period $\Lambda$. This period is related to the desired signal wavelength, $\lambda_s$, by the relation $\lambda_s=2n\Lambda$, where n is the average refractive index of the fiber. In some applications of fiber Bragg gratings it may be necessary to precisely control the period $\Lambda$, and this control may be achieved using the invention as indicated in FIGS. 2 and 3, where the error signal is, for example, the degree to which the signal power transmitted through the fiber Bragg grating deviates from a near-zero setpoint value.

Applications to coherent laser radar derive from the desire to control the frequency of a transmitted laser signal to match that of a local oscillator, thereby enabling efficient coherent detection to be achieved. As is well known in the art, the frequency of any laser depends on the optical length between two reflectors that define the opposite ends of the laser resonator. This fact may be exploited to control the frequency of the transmitted laser signal. For example, the transmitted laser at a frequency $v_s$ may be combined on a suitable detector along with a reference laser operating at a frequency $v_r$, and the detector output may be processed to produce an electrical error signal proportional to the frequency difference $v_r-v_s$. For a laser transmitter comprising a fiber laser, this error signal may be used as the control input to a feedback controller, as was discussed in relation to FIG. 2, to maintain the length and hence the frequency of the fiber laser at a desired setpoint value.

Figures 6A, 6B, 6C, 6D:
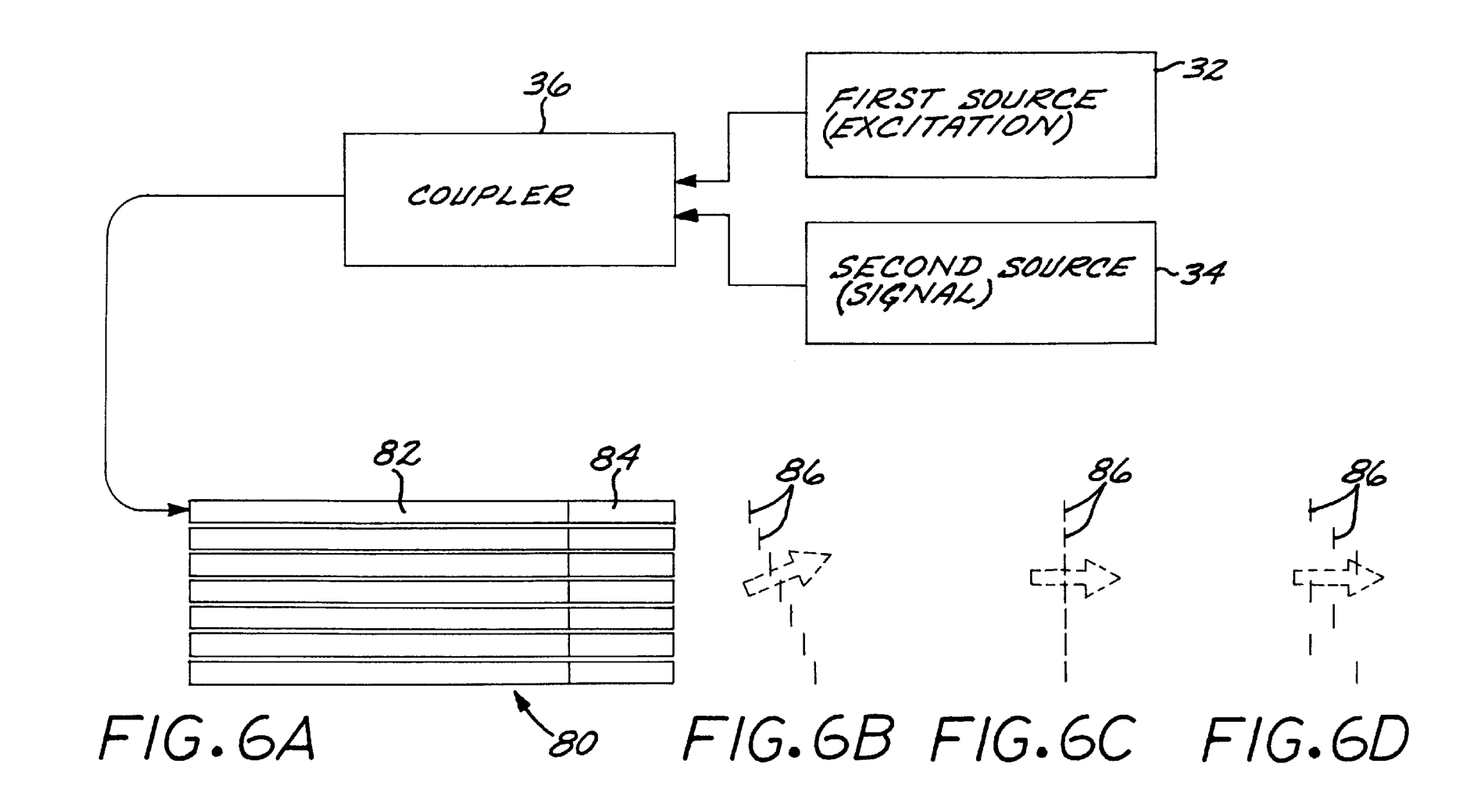
FIG. 6A is an array of optical fibers.
FIGS. 6B, 6C, and 6D are schematic depictions of three phase fronts that may be produced with the array of optical fibers.

A third application is that of controlling the relative phase differences of the outputs of individual fibers in a fiber array. This application is schematically indicated in FIGS. 6A–6D, which shows an exemplary array 80 of seven optical fibers 82. The optical fibers 82 are illustrated as arranged in a planar, one-dimensional array for clarity in the following discussion, but they could be arranged in a two-dimensional or three-dimensional array as well. Each of the seven optical fibers 82 includes a variable phase shifter 84. Each phase shifter 84 is made and operates to allow the variation of the optical length of the respective optical fiber 82, according to the earlier discussion, which is incorporated here. Each phase shifter 84 may be made integral with its respective optical fibers 82, by doping the optical fibers with absorbing ions, or provided as separate ion-doped optical fiber elements through which the beams of the optical fibers 82 are directed. The dopant and dopant concentration are preferably the same for each phase shifter 84, but may be different. In FIG. 6A, the phase shifters 84 are shown a separate elements. For each of the optical fibers 82, there is provided the first source 32 for excitation of the phase shifter 84, and the second source 34 for the signal transmitted through the optical fiber 82, both coupled into the optical fiber 82 by the coupler 36. The prior description of these elements is incorporated here. For clarity, only one of the sets of first source 32/second source 34/coupler 36 is shown, but in practice this arrangement is provided for each optical fiber 82. In some embodiments, the same second source 34 may be used for more than one, or for all, of the optical fibers 82. The control system with feedback controller 39, illustrated in FIG. 2, may also be provided for each of the optical fibers 82 of this array 80.

In the absence of any phase control, the phase fronts 86 of the individual optical fibers 82 are randomly arranged relative to each other, as schematically indicated in FIG. 6D. For some applications, this situation is undesirable, because the resulting illumination intensity from the fiber array 80 is relatively low and the pointing direction is uncertain. When each of the optical fibers 82 in the array 80 includes the variable phase shifter 84, the optical length of each optical fiber 82 in the array 80 may be controlled by separately exciting the doped absorbing ions in the different phase shifters 84, in the manner discussed previously.

By varying the optical lengths of the individual optical fibers 82, the relationship of the phase fronts 86 may be controlled. Two examples of such control are shown in FIGS. 6B and 6C. As illustrated in FIG. 6C, the phase shifters 82 may be operated to ensure that the phase fronts 86 are aligned to be in-phase (i.e., at the same location in the direction of propagation), to accomplish the coherent combination of the optical fiber outputs to form larger and/or higher-power beams comprised of the signals from each optical fiber 82 in the fiber array 80. The phase shifters 84 may instead be operated so that there is a selected spatial displacement in the direction of propagation between the phase fronts 86, as shown in FIG. 6B. In the example illustrated in FIG. 6B, the phase fronts 86 are provided with a constant phase difference between laterally adjacent optical fibers 82. The beam composed of all of the optical fiber outputs is thereby aimed in a selected direction. By changing the excitation imposed by the first source 32 of each of the optical fibers 82 in a controlled manner, the aiming direction may be selectively changed to achieve non-mechanical scanning of the pointing direction of the array output. Other phase differences may be imposed to accomplish other beam-forming functions, such as focusing or the formation of more than one discrete output beam.

The present invention may also be employed to control the temperature of the optical fiber, without consideration of whether the optical length is controlled as well. (That is, the established optical length is incidental to the application of interest.) For example, a thermally controlled attenuator utilizes an absorbing ion doped into the optical fiber. By selecting the ion such that the absorption arises from a high-lying state in the ground-state manifold, the population density of the absorbing state, and therefore the absorption coefficient, is highly sensitive to temperature. The absorption coefficient of the attenuator at the signal wavelength is therefore controlled by varying the temperature by the approach discussed herein, using the optical beam at the excitation wavelength.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An optical fiber device, comprising:
   a first optical fiber having a first-fiber core region transmissive to optical energy of a signal wavelength and absorptive to optical energy of an excitation wavelength different from the signal wavelength, the first optical fiber comprising a concentration of dopant ions residing within the core region, the dopant ions being operable to absorb optical energy at the excitation wavelength;
   a first source of optical energy of the excitation wavelength coupled into the first-fiber core region of the first optical fiber, the first source of optical energy being operable in a first state with a first power output and operable in a second state with a second power output different from the first power output; and
   a second source of optical energy of the signal wavelength coupled into the first-fiber core region of the first optical fiber.

2. The optical fiber device of claim 1, wherein the optical fiber device further comprises
   a second optical fiber.

3. The optical fiber device of claim 2, wherein the second optical fiber comprises
   a second-fiber core region having resident therein substantially the same concentration of the dopant ions as in the first-fiber core region of the first optical fiber.

4. The optical fiber device of claim 2, wherein the first source of optical energy of the excitation wavelength is not coupled into the second optical fiber.

5. The optical fiber device of claim 2, wherein an optical path length of the first optical fiber is different from an optical path length of the second optical fiber.

6. The optical fiber device of claim 1, wherein the first optical fiber comprises one arm of an interferometer.

7. The optical fiber device of claim 1, wherein the first optical fiber is a discrete optical fiber.

8. The optical fiber device of claim 1, wherein the first optical fiber is a waveguide of an integrated optical waveguide.

9. The optical fiber device of claim 1, further including:
   a controller operable to control the first source of optical energy.

10. The optical fiber device of claim 1, wherein the first source of optical energy is longitudinally coupled into the first-fiber core region so that the optical energy of the excitation wavelength travels along the length of the first optical fiber.

11. The optical fiber device of claim 1, wherein the first optical fiber comprises an element of a fiber Bragg grating.

12. The optical fiber device of claim 1, wherein the first optical fiber comprises an element of a coherent laser radar.

13. The optical fiber device of claim 1, wherein the first optical fiber comprises an element of an optical fiber array.

14. An optical fiber device, comprising:
   a first optical fiber comprising one arm of an interferometer and having a first-fiber core region transmissive to optical energy of a signal wavelength and absorptive to optical energy of an excitation wavelength different from the signal wavelength, the first optical fiber comprising a concentration of dopant ions residing within the first-fiber core region, the dopant ions being operable to absorb optical energy at the excitation wavelength;
   a second optical fiber having a second-fiber core region transmissive to optical energy of the signal wavelength and absorptive to optical energy of the excitation wavelength different from the signal wavelength;
   a first source of optical energy of the excitation wavelength coupled into the first optical fiber, the first source of optical energy being operable in a first state with a first power output and operable in a second state with a second power output different from the first power output; and
   a second source of optical energy of the signal wavelength coupled into the first optical fiber and the second optical fiber.

15. The optical fiber device of claim 14, wherein the first source of optical energy is coupled into the first optical fiber but not into the second optical fiber.

16. The optical fiber device of claim 14, wherein the second optical fiber comprises
   a second-fiber core region having resident therein substantially the same concentration of the dopant ions as in the first-fiber core region of the first optical fiber.

17. The optical fiber device of claim 14, wherein a second optical path length of the second optical fiber is different from a first optical path length of the first optical fiber.

18. An optical fiber device, comprising:
   a first optical fiber having a first-fiber core region transmissive to optical energy of a signal wavelength and absorptive to optical energy of an excitation wavelength different from the signal wavelength, the first optical fiber comprising a concentration of dopant ions residing within the first-fiber core region, the dopant ions being operable to absorb optical energy at the excitation wavelength;
   a second optical fiber having a second-fiber core region transmissive to optical energy of the signal wavelength and absorptive to optical energy of the excitation wavelength different from the signal wavelength;
   a first source of optical energy of the excitation wavelength coupled into the first optical fiber, the first source of optical energy being operable in a first state with a first power output and operable in a second state with a second power output different from the first power output;

a second source of optical energy of the signal wavelength coupled into the first optical fiber and the second optical fiber; and a third source of optical energy of the excitation wavelength coupled into the second optical fiber.

19. A method for operating an optical fiber device, comprising the steps of providing an optical fiber device including a first optical fiber having a first-fiber core region transmissive to optical energy of a signal wavelength and absorptive to optical energy of an excitation wavelength different from the signal wavelength, the first optical fiber comprising a concentration of dopant ions residing within the core region, the dopant ions being operable to absorb optical energy at the excitation wavelength, a first source of optical energy of the excitation wavelength coupled into the first-fiber core region of the first optical fiber, and a second source of optical energy of the signal wavelength coupled into the first-fiber core region of the first optical fiber; thereafter operating the first source of optical energy in a first state to cause the first optical fiber to absorb a first quantity of optical energy;

operating the second source of optical energy to transmit a first signal through the first optical fiber;

further operating the first source of optical energy in a second state to cause the first optical fiber to absorb a second quantity of optical energy; and further operating the second source of optical energy to transmit a second signal through the first optical fiber.

20. The method of claim 19, wherein the optical fiber device further comprises a second optical fiber.

21. The method of claim 20, wherein the second optical fiber comprises a second-fiber core region having resident therein substantially the same concentration of the dopant ions as in the first-fiber core region of the first optical fiber.

22. The method of claim 20, wherein the first source of optical energy of the excitation wavelength is not coupled into the second optical fiber.

23. The method of claim 20, wherein a phase front of the first optical fiber is controlled to have a selected relationship to the phase front of the second optical fiber.

24. The method of claim 19, wherein the first optical fiber comprises one arm of an interferometer.

25. The method of claim 19, wherein the first optical fiber is a discrete optical fiber.

26. The method of claim 19, wherein the first optical fiber is a waveguide of an integrated optical waveguide.

27. The method of claim 19, wherein the first optical fiber has a first temperature in the first state, and a second temperature in the second state.

28. The method of claim 19, wherein the first optical fiber has a first index of refraction in the first state, and a second index of refraction in the second state.

29. The method of claim 19, wherein the first optical fiber has a first polarizability in the first state, and a second polarizability in the second state.

30. The method of claim 19, wherein the first optical fiber comprises an element of a fiber Bragg grating.

31. The method of claim 19, wherein the first optical fiber comprises an element of a coherent laser radar.

32. The method of claim 19, wherein the first optical fiber comprises an element of an optical fiber array.

* * * * *